(12) United States Patent
Dooley

(10) Patent No.: US 7,965,052 B2
(45) Date of Patent: Jun. 21, 2011

(54) MOTOR DRIVING SYSTEM AND METHOD FOR STARTING A MOTOR

(75) Inventor: Kevin Allan Dooley, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 520 days.

(21) Appl. No.: 12/177,286

(22) Filed: Jul. 22, 2008

(65) Prior Publication Data

US 2010/0019707 A1    Jan. 28, 2010

(51) Int. Cl.
*H02P 6/04* (2006.01)
(52) U.S. Cl. .......... 318/400.11; 318/400.1; 318/431
(58) Field of Classification Search .......... 318/400.11, 318/400.1, 276, 720, 724, 430, 431, 432, 318/433, 434, 439
See application file for complete search history.

(56) References Cited

U.S. PATENT DOCUMENTS

| | | | |
|---|---|---|---|
| 6,483,270 B1 | 11/2002 | Miyazaki et al. | |
| 6,791,293 B2 | 9/2004 | Kaitani | |
| 6,801,012 B1 | 10/2004 | Mir et al. | |
| 7,030,582 B2 | 4/2006 | Masino | |
| 7,095,204 B2 | 8/2006 | Lee et al. | |
| 7,166,982 B2 | 1/2007 | Takahashi et al. | |
| 7,253,581 B2 | 8/2007 | Koide et al. | |
| 7,274,161 B2 | 9/2007 | Mori et al. | |
| 2005/0029976 A1 | 2/2005 | Terry et al. | |
| 2006/0113954 A1 | 6/2006 | Ma et al. | |
| 2007/0085501 A1* | 4/2007 | Choi et al. | 318/276 |
| 2007/0149338 A1 | 6/2007 | Ebner et al. | |

FOREIGN PATENT DOCUMENTS

| | | |
|---|---|---|
| JP | 6276782 | 9/1994 |
| JP | 7327390 | 12/1995 |
| JP | 2003009581 | 1/2003 |

* cited by examiner

*Primary Examiner* — Karen Masih
(74) *Attorney, Agent, or Firm* — Ogilvy Renault LLP

(57) ABSTRACT

A method and system is provided for starting a motor which is useful, among other things, is useful for motors under unknown or variable load/inertia conditions. If a first attempt to start the motor using a first frequency ramp-up rate fails, a subsequent start attempt may be performed at a decreased frequency ramp-up rate. Iteration may be performed until starting of the motor is successfully achieved.

20 Claims, 4 Drawing Sheets

MOTOR DRIVING SYSTEM AND METHOD FOR STARTING A MOTOR

TECHNICAL FIELD

The present application relates to sensorless motor starting schemes, method and systems.

BACKGROUND

In "sensorless" synchronous electric motors, a measure of a generated electromotive force (EMF) in undriven coils of the motor is used to infer a rotor's position, thereby eliminating the need for Hall effect sensors or a rotary encoder. However, sensorless motors can be difficult to start because no generated EMF is produced when the rotor is stationary. Since measuring generated EMF does not permit a determination of an amount of torque necessary to permit motion in the motor in accordance with a motor condition, initiating motion is generally accomplished by trial and error. That is, the motor is started using any arbitrary phase and skipping to another phase if it the first is found to be wrong. Such trial and error can cause the motor to run briefly backwards, adding even more complexity to the startup sequence.

For the above reasons, prior art sensorless motors are further known to experience added difficulties when the motor is started under unknown load or inertia conditions. These are thus not suited for variable load or inertia conditions. Such difficulties can be caused by driving the motor at an incorrect commutation speed or frequency. An example of such a situation occurs when attempting to start an oil pump over a wide range of oil temperatures.

There is therefore a need to provide improved methods and systems for starting a sensorless motor.

SUMMARY

In accordance with an embodiment, there is provided a method for starting a motor driven by a sensorless controller, the method comprising the steps of: a) initiating a start attempt of the motor using a start signal increasing in frequency according to a rate of change; b) determining a state of the motor, the state consisting of one of a start failure state and a start success state; c) when the state determined is the start failure state, initiating a subsequent start attempt of the motor using a start signal increasing in frequency according to a new rate of change which is less than the rate of change used in the previous start attempt; d) repeating b) and c) until the start success state is determined; and e) when the state determined is the start success state, activating a sensorless driving of the motor.

In accordance with another embodiment, there is provided a method of starting a motor comprising the steps of: a) initiating a start attempt of the motor using a start signal varying in frequency from zero to a maximum frequency according to a first ramp-up rate; b) determining a state of the motor, the state consisting of one of a start failure state and a start success state; c) when a start failure state is determined, initiating a subsequent start attempt of the motor using a new start signal, the new start signal varying in frequency from zero to a maximum frequency according to a new ramp-up rate, the new ramp-up rate being less than the ramp-up rate of the previous start attempt; and d) iterating steps b) and c) until a start success state is achieved.

In accordance with another embodiment, there is provided a sensorless motor driving system for starting a motor driven by a sensorless controller, the sensorless motor driving system comprising: a sensorless motor driver for starting the motor according to a start attempt and for driving the motor according to a sensorless operating mode once the motor is started; a detector for determining a state of the motor, the state of the motor consisting of one of a start failure and a start success of the start attempt; and a signal generator generating a start signal varying in frequency according to a rate of change dependent on a drive current of the motor, the start signal being sent to the motor driver to initiate the start attempt; the signal generator having a controllable frequency drive for decreasing the rate of change when the state of the motor is determined by the detector as the start failure, the signal generator resending the start signal to the motor driving device according to the rate of change decreased to initiate another start attempt when the start failure is determined.

BRIEF DESCRIPTION OF THE DRAWINGS

Further details will be apparent from the following detailed description, taken in combination with the appended figures, in which.

It will be noted that throughout the appended drawings, like features are identified by like reference numerals.

DETAILED DESCRIPTION

Figure 1:
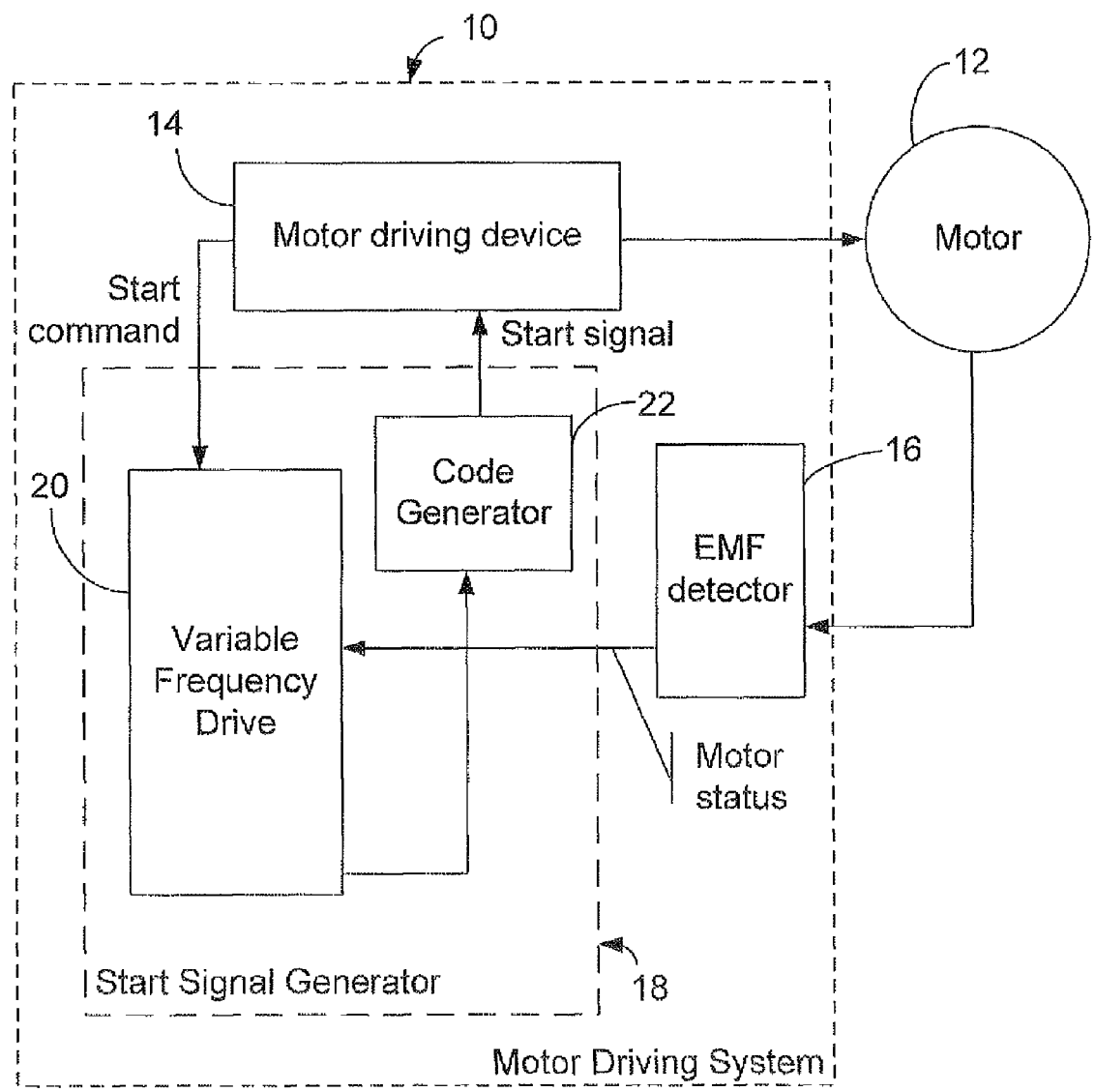
FIG. 1 is an example of a schematic view of a motor driving system for starting a motor.

The motor driving system 10 as exemplified in FIG. 1 enables the starting and the driving of a motor 12 having a rotatable rotor and a stator with stator coils. Such a motor can be a brushless DC motor, a sensorless permanent magnet motor or any suitable motor architecture. The driving system 10 has a motor driving device 14 adapted to be coupled to the motor 12.

The driving system 10 also has a generated electromotive force (generated-EMF) detector 16 and a start signal generator 18.

The detector 16 is coupled to the motor 12 and determines a start success or a start failure of a starting attempt by detecting whether the motor 12 is rotating (in a rotating state) or not rotating (in a, stopped/non-rotating state) based on a presence or an absence, respectively, of an electromotive force (EMF). A start failure can also by determined from a presence of an improper electromotive force which is inconsistent with a given start drive direction for example. An improper electromotive force can be for example when the EMF detected is indicative of the rotor rotating backwards or in a direction opposite to an expected direction.

The start signal generator 18 interacts with both the motor driving device 14 and the detector 16.

The motor driving device 14 enables the starting of the motor 12 and, once the motor 12 is successfully started, a driving of the motor 12 according to a sensorless operating mode.

The detector 16 can be any type of detector which detects a rotation of a rotor of the motor 12. Such a detector can be an electromotive force (EMF) detector which produces a voltage according to an absence or a presence of an EMF as produced by a rotation of a motor. The detector 16 can also have an EMF detector circuit for detecting EMF signals generated from the rotation of the rotor (known as generated-EMF) at zero voltage-crossings.

Still referring to FIG. 1, the start signal generator 18 generates a start signal. The frequency of the start signal is varied from a first to a final frequency according to a selected rate of change. For example, the first frequency can be set at a, zero frequency, or other low value (as discussed further below) and the final frequency as a selected maximum frequency. The rate of change, or ramp-up rate, defines how quickly the frequency increases from the first to the final frequency in a given start sequence.

The rate of change with which the signal is increased, from the first to the final frequency, is chosen according to a success or a failure of a starting attempt of the motor 12, as detected by the detector 16. An initial rate of change for an initial start attempt is chosen using considerations suitable for the particular motor under consideration.

For example, where motor 12 is a permanent magnet motor, the initial rate of change may be based on a driving current to be supplied to the motor 12. The skilled reader will appreciate that driving current is related to the electromagnetic torque produced by the motor. The acceleration rate of the motor is thus proportional to the driving current. The driving current supplied to the motor may be dependent on temperature or supply voltage variability or may be controlled at a specific current value. The acceleration rate (a) of a permanent magnet motor is directly proportional to torque and inversely dependant on the polar moment of inertia (i) (i.e. T=i*a, where T is the net torque available and is the result of motor torque (t)–drag torque (t)). The torque (t) delivered by a permanent magnet motor is directly proportional to the supply current. Although an electrically-driven pumps and compressors do have an associated drag torque component associated with pumping, the drag torque tends to increase as a function of speed in an exponential function, such that it typically has a negligible effect on starting the motor. Therefore, since the drag torque is generally negligible at starting speeds, the motor acceleration rate is dependant mainly on inertia (I) and current (torque). Since the inertia in a given system is generally fixed, the acceleration rate becomes a direct function of the current provided to the motor (torque).

Thus for a given current and the t/A coefficient for the motor, and for a given polar moment of inertia (i), one can predict the acceleration rate of the motor and load system, and thus establish an ideal rate at which the commutation frequency should be increased for optimum starting performance. Ramping up (i.e. accelerating) faster than the optimum rate may lead to a failed start because the acceleration of the motor will not be able to keep in sync with the acceleration rate of the drive. If the acceleration rate of the motor exceeds the acceleration rate of the rotating magnetic field due to an excess of torque (current), synchronism may also lead to a start failure.

In the present approach, either the motor load is unknown or not determined. As mentioned, motor starting is thus attempted by varying the frequency of the start signal, from a first (zero or low) frequency to a final frequency according to a selected rate of change. If the start attempt fails to start the motor at the selected ramp-up rate (i.e. a, start failure is determined), then a subsequent start, attempt may be performed using a start signal increasing in frequency according to a new, lower ramp-up rate. This start-up cycle may be performed iteratively until a successful start is achieved.

In one example, the start signal generator is implemented as a variable frequency drive 20 with a code generator 22. The variable frequency drive 20 is controllable by a motor status signal which is received from the detector 16. The rate of change for the frequency of the start signal is therefore set according to the motor status as read after the previous start attempt. The code generator 22 then generates the start signal, as varying in frequency according to the set rate of change.

Figure 2A:
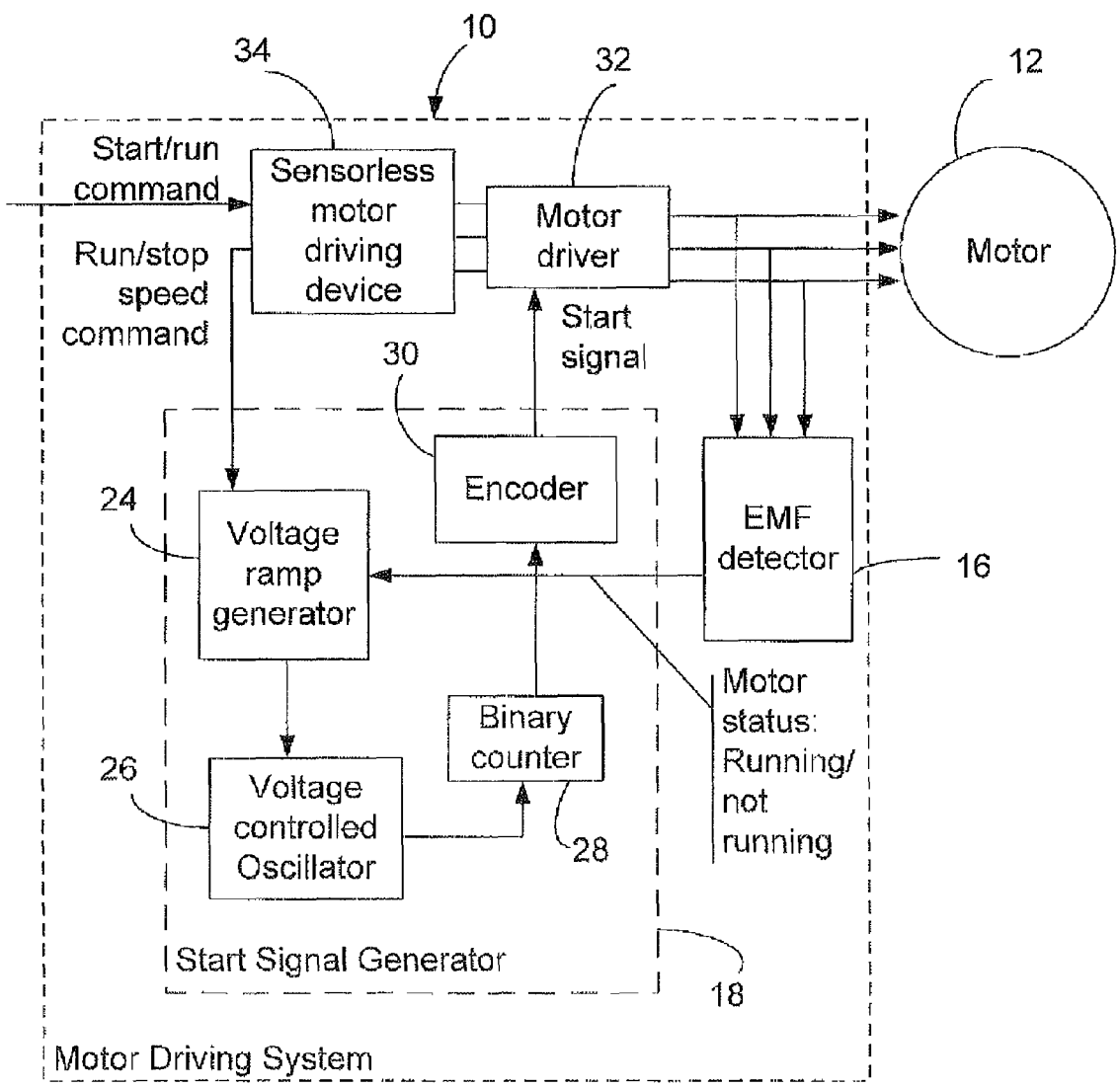
FIG. 2a is a schematic view of a further particular example of the motor driving system.

The above can also be implemented as illustrated in FIG. 2a. FIG. 2a illustrates a particular implementation of the motor driving system 10 in which the start signal generator 18 has a variable voltage ramp generator 24, a voltage controlled oscillator 26, a counter 28 and an encoder 30.

Figure 2B:
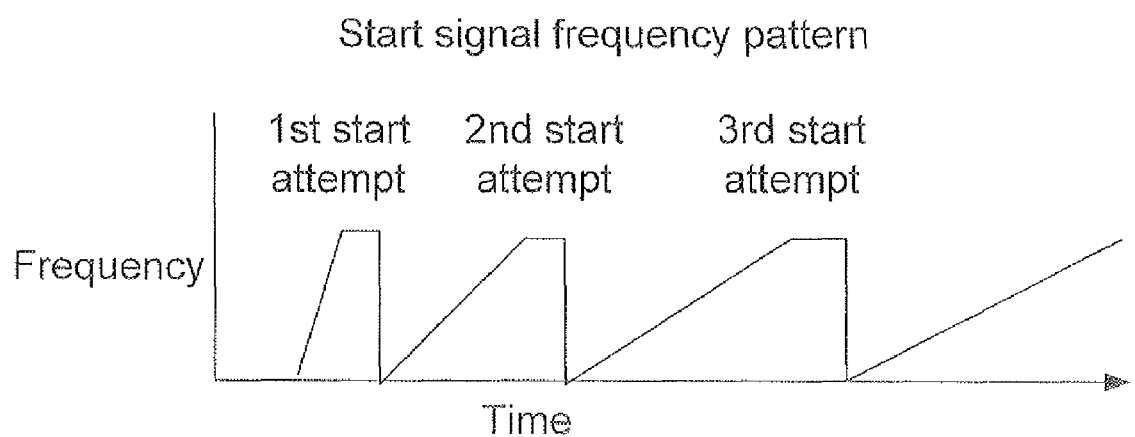
FIG. 2b is a graphic illustrating a start frequency pattern over time.

The variable voltage ramp generator 24 generates a voltage which is increased (or ramped up) in time in accordance with a chosen rate of change for varying the frequency of the start signal. As detailed above, this rate of change is first preset for an initial starting attempt of the motor and then set for each subsequent starting attempts based on a motor status signal as received from the detector 16 after each starting attempt. The voltage ramp generator 24 generates a voltage varying in time. This voltage is sent to the voltage controlled oscillator 26 such that a frequency varying in time as illustrated in FIG. 2b is generated by the voltage controlled oscillator 26.

The counter 28 with the encoder 30 then generate an encoded start signal for output by the start signal generator 18. The encoded start signal is thus increased in frequency from a first frequency to final frequency, as detailed hereinabove, in accordance with a slope, i.e. a rate of change, provided by the voltage ramp generator 24.

It is noted that the encoding of the start signal, and thus the presence of the encoder 30, are optional and may be further adapted according to a specific implementations or motor types. The encoder 30 codes the start signal according to a given pattern which is chosen based on a given motor configuration. One of multiple examples of possible patterns for the coded start signal is a 6 step wave pattern.

Also as illustrated in FIG. 2a, the motor driving device 14 can have a motor driver 32 for driving a rotor (not shown) of the motor 12, and a sensorless motor driving device 34 for implementing a sensorless driving mode of the motor 12 once successfully started.

The motor 12 may be a permanent magnet motor such as detailed in U.S. Pat. No. 7,262,539. In this case, for example, the motor driver 32 of FIG. 2a is a three phase bridge driver.

The counter 28 is implemented as a binary counter which outputs a binary count signal at a frequency proportional the counter 28 input frequency. Any suitable counter can however be used.

If the counter 28 is a binary counter, the encoder 30 encodes the binary signal such that the encoder output provides a six step drive pattern, suited to drive each of the switches of the 3 phase bridge driver circuit, start signal frequency delivered to the input of the binary counter increases (or ramps up) in frequency according to the rate of change of speed desired for the motor start. This increase in frequency can follow a pattern such as a number of finite steps or can be a smoothly or continuously increasing frequency.

The patterned coded drive signal is then sent to the motor driver 32 to start the motor 12 accordingly. The counter may be decoded to other driving patterns, such as a three phase sine wave pattern or other suitable patterns, depending on motor configuration, etc.

The driving system 10 as illustrated in FIGS. 1 and 2 implements a method for starting a sensorless motor which may be useful, among other purposes, for starting motors with unknown and/or variable loads or inertia. One example of a motor having an unknown or variable load is an electrically driven oil pump on an aircraft engine. In very cold temperatures, oil viscosity may present a very high load to the oil pump, and vice versa at higher temperatures.

Figure 3:
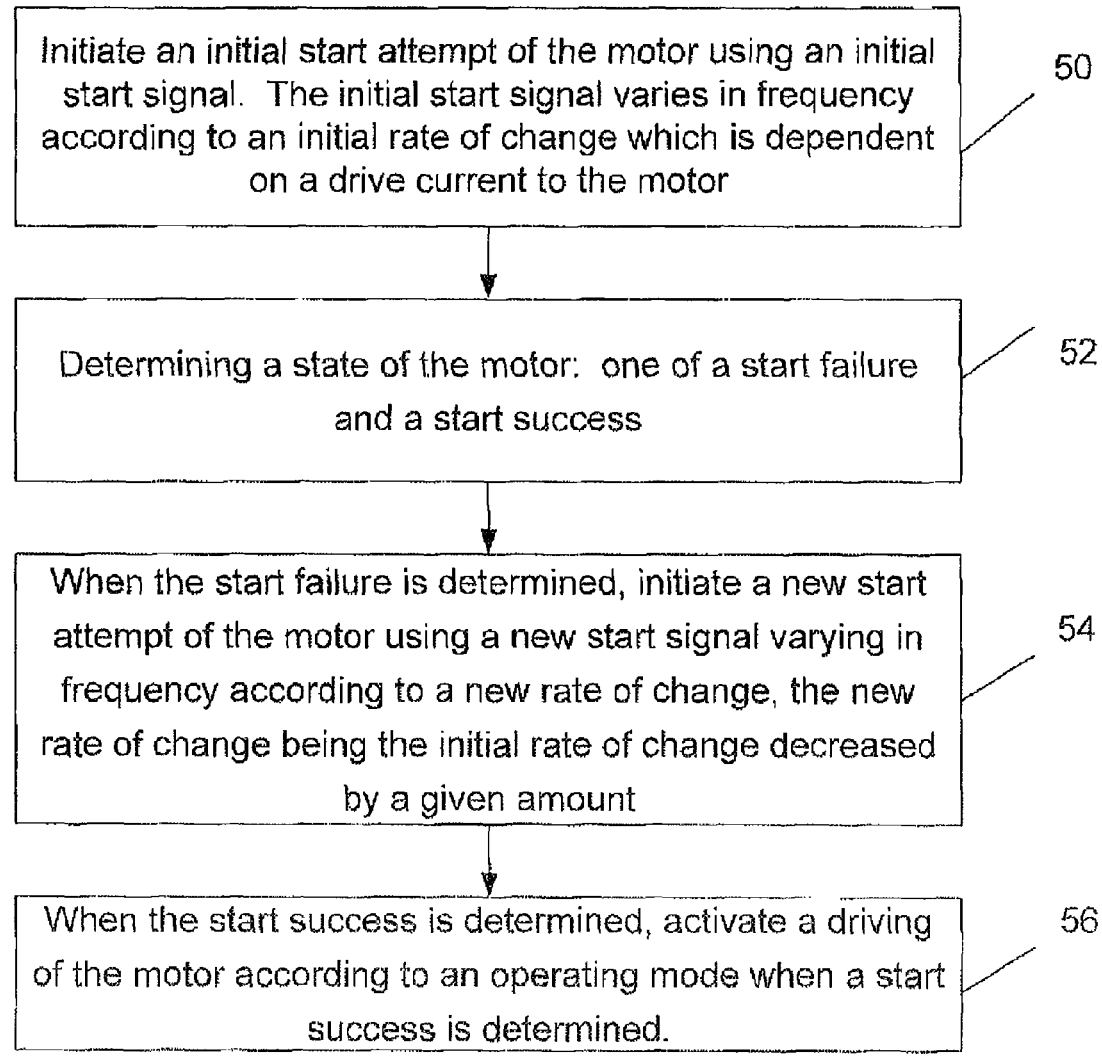
FIG. 3 is a flow chart illustrating a method for starting a motor.

Now referring to FIG. 3, which provides a flow chart of the method, an initial start attempt of the motor is performed at step 50 using an initial start signal. The initial start signal varies in frequency from a zero or low frequency (discussed further below) according to an initial rate of change which is proportional and dependent on a drive current to the motor.

In step 52, a state of the motor is determined as being one of a start failure and a start success for a start attempt. Such a start failure and a start success can be determined by detecting an absence of generated electromotive force (EMF) and a presence of a generated EMF respectively at the motor, or by any other suitable approach.

A start success is detected when the motor has successfully started and is properly rotating. If the rotor rotates properly, a proper corresponding electromotive force (EMF) is generated by the motor rotating (this may not be at a synchronous speed of the drive signal however, the direction of rotation must be correct) in the desired direction. (If the motor does rotate, but in reverse, a start failure is determined from the detection of a presence of an improper EMF, which indicates that the rotor is in an improper rotating state.)

In the case when the motor has successfully started, i.e. when a start success is determined, the motor driving device enters a sensorless operating mode (also referred to as a run mode), indicated as step 56 in FIG. 3. The operating mode may be one of many possible modes of sensorless operation of the motor.

In the case when the motor has not successfully started, i.e. when a start failure is determined, a new start attempt is initiated, step 54, with the initial rate of change being decreased by a given amount to obtain a new rate of change. The new rate of change may be selected in any suitable manner.

Hence, in step 54, the new start attempt is initiated using a new start signal which varies according to the new decreased rate of change. The new start attempt has the initial or previous start signal being resent to the motor driver by resetting the start signal to the first frequency and ramping up the signal once again to the final frequency, this time according to the new rate of change.

In one example, the new rate of change set as half of the previously-attempted rate of change. As mentioned, the new rate of change may be selected in any suitable manner.

The steps 52 and 54 are then repeated each time a start failure is determined, until a start success is determined indicating that the motor is being driven at an acceleration rate appropriate for the load carried by the motor, as indicated by step 56. This 52-54 loop is indicated by the arrows from step 54 back to step 52. These steps may thus be iterated until starting is achieved.

In step 56, once starting is achieved, a driving of the motor is activated according to a sensorless operating mode. Step 56 may involve the activation of a sensorless closed-loop motor driving mode.

The above method may be adapted depending on whether the rotor is stationary and/or in a desired position prior to a start attempt, or whether the rotor is moving.

Stopping the rotor may be done to improve starting success. In such a case, each one of steps 50 and 54 of FIG. 2a may further comprise a step of ensuring that the rotor is stationary prior to sending the start signal to the motor. Ensuring that the rotor is stationary may be performed, for example, by sending initial static phase currents, as described in co-pending application Ser. No. 11/421,089, and may involve a closed loop method step, whereby a generated-EMF detector is used to verify whether the rotor is effectively stationary (i.e. in a stopped state). The rotor may be put into a known position relative to the motor coils to be activated first, which can be achieved by initially exciting a given phase or phase pair at zero frequency for a period of time, resulting in the rotor magnets becoming aligned to a specific position, rotating the rotor slightly if necessary. Positioning the rotor in this manner ensures that the next coils to be activated by the drive will be in the correct direction for starting. When the rotor is stopped, it has a zero rotational frequency (0 Hz).

When starting a stopped rotor, since the stopped rotor's speed is initially zero, the first frequency selected for beginning the starting sequence may be zero. By exciting the armature at zero frequency, a specific pair of phases will be excited which will pull or push the rotor into a corresponding position and hold it there momentarily, which makes it ready for the next phase sequence to be activated, which ensures the rotor will rotate initially in the correct direction, avoiding the possibility of a reverse direction ramp up.

When stopping of the rotor is not needed/desired, the steps 50-54 may further comprise the step of establishing a direction of rotation of the rotor prior to a start attempt. (To establish a direction of rotation, the rotor may be required to rotate at a sufficient rotational speed to produce a detectable generated-EMF signal.) A start attempt wherein the rotor is already moving may be initiated with a start signal whose frequency can be synchronized with a rotational speed of the motor which is associated to the established direction of the rotor. When the rotor is already rotating in the unstarted motor, its rotor has a non-zero rotational frequency (>0 Hz), but such frequency will typically be below an operating frequency of the motor.

If the rotor is already rotating in the correct direction at a speed sufficient to obtain rotor position data, starting may not be necessary, and the drive system may be put immediately into the sensorless drive mode, however for the purposes of this description, it is assumed that the rotating rotor requires a starting sequence.

If the rotor is already rotating, as mentioned the generated voltages from the phases may be used to determine the state of the rotor and its direction of rotation prior to applying the ramp up. If the direction of rotation was determined to be correct, the first frequency selected for the ramp-up frequency may be equal to the frequency detected from the phases if the direction of rotation was correct. If the direction of rotation is incorrect, however, then the ramp-up frequency may be started at zero frequency instead, as described above, to stop the rotor rotation and position it into a desired initial position prior to starting to increase the frequency.

Thus, the starting frequency ramp-up may commence at zero frequency, say if the rotor is stop of rotating in an undesirable way, or a frequency other than zero if the rotor is already rotating in a desirable manner. The step 50 may therefore comprise the step of determining an initial rotation state of the rotor.

The present system and method may be implemented in a digital configuration using a microprocessor or embedded control system running a software program that achieves the result described above.

Motor rotation may be initiated using the above teachings in a synchronous or non-synchronous mode (i.e. the rotor can be made to rotate in the correct direction even if the rotor rotation is not synchronized with the drive signal frequency). If the rotor is rotating in the correct direction (e.g. a correlated three phase generated EMF or other affirmative feedback is detected), the system may be switched to the run mode.

The embodiments described above are intended to be exemplary only, and are susceptible to modification without departing from the present application. For example, any suitable sensorless motor and motor driver may be used. Any suitable sensorless driving approach may be employed. Any suitable detecting technique may be employed to detect rotation of the motor and failure of the start attempts. Any suitable arrangement of motor, driver, signal generator and detector may be used. The application is therefore intended to be limited solely by the scope of the appended claims.

The invention claimed is:

1. A method for starting a motor driven by a sensorless controller, the method comprising the steps of:
   a) initiating a start attempt of the motor using a start signal increasing in frequency according to a rate of change;
   b) determining a state of the motor, the state consisting of one of a start failure state and a start success state;
   c) when, the state determined is the start failure state, initiating a subsequent start attempt of the motor using a start signal increasing in frequency according to a new rate of change which is less than the rate of change used in the previous start attempt;
   d) repeating b) and c) until the start success state is determined; and
   e) when the state determined is the start success state, activating a sensorless driving of the motor.

2. The method of claim 1, wherein the rate of change is selected in step a) based on a drive current of the motor.

3. The method of claim 1, further comprising determining a rotor rotational speed and direction prior to initiating a start attempt.

4. The method of claim 1, further comprising the step of stopping the rotor prior to initiating a start attempt.

5. The method of claim 3, wherein the start signal varies from a first frequency selected depending on at least one of a determined rotational speed and a determined direction of the rotor.

6. The method of claim 5, wherein the rotor is one of stopped and rotating backwards, and wherein the first frequency is selected as zero.

7. The method of claim 5, wherein the rotor is rotating in a correct direction at a determined speed, and wherein the first frequency is selected to match the determined speed.

8. The method of claim 1, wherein each start attempt is initiated using a same initial frequency.

9. The method of claim 1, wherein the new rate of change is half the previous rate of change.

10. The method of claim 1, wherein said start signal is generated by controlling a, variable frequency drive to increase the frequency of the said start signal according to its respective rate of change.

11. The method of claim 1, wherein said start signal is encoded using a six-step pattern varying in frequency according to the rate of change.

12. The method of claim 1, wherein a) comprises increasing the initial start signal from a zero frequency to a maximum frequency according to the rate of change.

13. The method of claim 12, wherein c) comprises increasing the subsequent start signal from a zero frequency to a maximum frequency according to the new rate of change.

14. A method of starting a motor comprising the steps of:
   a) initiating a start attempt of the motor using a start signal varying in frequency from zero to a maximum frequency according to a first ramp-up rate;
   b) determining a state of the motor, the state consisting of one of a start failure state and a start success state;
   c) when a start failure state is determined, initiating a subsequent start attempt of the motor using a new start signal, the new start signal varying in frequency from zero to a maximum frequency according to a new ramp-up rate, the new ramp-up rate being less than the ramp-up rate of the previous start attempt; and
   d) iterating steps b) and c) until a start success state is achieved.

15. The method of claim 14 wherein the new ramp-up rate is half of the ramp-up rate of the previous start attempt.

16. The method of claim 14 wherein steps a) and c) further comprise holding the zero frequency until rotor rotation is stopped, and then varying the frequency according to the ramp-up rate.

17. A sensorless motor driving system for starting a motor driven by a sensorless controller, the sensorless motor driving system comprising:
   a sensorless motor driver for starting the motor according to a start attempt and for driving the motor according to a sensorless operating mode once the motor is started;
   a detector for determining a state of the motor, the state of the motor consisting of one of a start failure and a start success of the start attempt; and
   a signal generator generating a start signal varying in frequency according to a rate of change dependent on a drive current of the motor, the start signal being sent to the motor driver to initiate the start attempt; the signal generator having a controllable frequency drive for decreasing the rate of change when the state of the motor is determined by the detector as the start failure, the signal generator resending the start signal to the motor driving device according to the rate of change decreased to initiate another start attempt, when the start failure is determined.

18. The system of claim 17, wherein the detector comprises a generated electromotive force (EMF) detector for detecting one of a presence and an absence of a generated EMF at a rotor of the motor to determine one of the start success and the start failure respectively.

19. The system of claim 17, wherein the signal generator comprises a code generator for encoding the start signal into a six-step coded pattern which varies in frequency according to the rate of change.

20. The motor driving system of claim 17, wherein the controllable frequency drive is configured to decrease the rate of change by half upon receiving a correspondingly decreased control voltage ramp.

* * * * *